United States Patent
Lee et al.

(10) Patent No.: US 10,746,996 B2
(45) Date of Patent: Aug. 18, 2020

(54) HEAD MOUNTED DISPLAY AND METHOD FOR CONTROLLING THE SAME

(71) Applicant: LG ELECTRONICS INC., Seoul (KR)

(72) Inventors: Seunghyun Lee, Seoul (KR); Sangrae Kim, Seoul (KR); Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 19 days.

(21) Appl. No.: 15/677,663

(22) Filed: Aug. 15, 2017

(65) Prior Publication Data

US 2018/0067316 A1 Mar. 8, 2018

(30) Foreign Application Priority Data

Sep. 8, 2016 (KR) .................. 10-2016-0115604

(51) Int. Cl.
| | |
|---|---|
| *G02B 27/01* | (2006.01) |
| *G06F 3/01* | (2006.01) |
| *G06F 3/0481* | (2013.01) |
| *G09G 3/00* | (2006.01) |

(52) U.S. Cl.
CPC .......... *G02B 27/0172* (2013.01); *G06F 3/011* (2013.01); *G06F 3/04815* (2013.01); *G09G 3/003* (2013.01); *G02B 2027/014* (2013.01); *G02B 2027/0134* (2013.01); *G02B 2027/0138* (2013.01); *G02B 2027/0141* (2013.01); *G02B 2027/0181* (2013.01); *G02B 2027/0187* (2013.01); *G09G 2354/00* (2013.01)

(58) Field of Classification Search
CPC ............ G06F 3/012; G02B 2027/0138; G02B 2027/0178; G02B 27/017; G02B 2027/014; G02B 2027/0187; G02B 27/0093; G06T 19/006
See application file for complete search history.

(56) References Cited

U.S. PATENT DOCUMENTS

| | | | | |
|---|---|---|---|---|
| 10,078,917 | B1 * | 9/2018 | Gaeta | ...................... G06F 3/012 |
| 2006/0058920 | A1 | 3/2006 | Matsunaga et al. | |
| 2010/0182220 | A1 * | 7/2010 | Bathiche | ................... G06F 3/01 345/7 |
| 2014/0375680 | A1 | 12/2014 | Ackerman et al. | |
| 2015/0352437 | A1 | 12/2015 | Koseki et al. | |
| 2016/0005232 | A1 * | 1/2016 | Quarles | ................. G06T 19/006 345/633 |
| 2016/0018655 | A1 * | 1/2016 | Imoto | ..................... G06F 3/011 345/8 |
| 2016/0189429 | A1 * | 6/2016 | Mallinson | .............. G02B 26/10 345/633 |
| 2018/0005443 | A1 * | 1/2018 | Poulos | ..................... G06F 3/017 |
| 2018/0165506 | A1 * | 6/2018 | George | ............. G06K 9/00087 |

FOREIGN PATENT DOCUMENTS

| | | |
|---|---|---|
| KR | 10-2016-0016540 A | 2/2016 |
| WO | 2015068656 A1 | 5/2015 |
| WO | 2015/139005 A1 | 9/2015 |

\* cited by examiner

*Primary Examiner* — Koosha Sharifi-Tafreshi
(74) *Attorney, Agent, or Firm* — Dentons US LLP

(57) ABSTRACT

Disclosed is a head mounted display and operating method thereof. The present invention includes obtaining use environment information of a user wearing the head mounted display, determining an use environment of the head mounted display based on the obtained use environment information, and adjusting a motion of the user wearing the head mounted display based on the determined use environment.

10 Claims, 13 Drawing Sheets

(a)

(b)

(a)

(a)

(a)

(a)

(a)

(b)

HEAD MOUNTED DISPLAY AND METHOD FOR CONTROLLING THE SAME

Pursuant to 35 U.S.C. § 119(a), this application claims the benefit of earlier filing date and right of priority to Korean Application No. 10-2016-0115604, filed on Sep. 8, 2016, the contents of which are hereby incorporated by reference herein in their entirety.

BACKGROUND OF THE INVENTION

Field of the Invention

The present invention relates to a head mounted display and method for controlling the same, and more particularly, to a terminal and controlling method thereof. Although the present invention is suitable for a wide scope of applications, it is particularly suitable for providing a tracking sensitivity according to a use environment of the head mounted display.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, devices a user can wear are recently released such as wearable devices.

Such a wearable device can be worn on a user body like a head mounted display wearable on a user's head, a watch type terminal wearable on a user's wrist and the like, and use a mechanism of tracking a body motion as an input means.

The body motion tracking mechanism is a considerably intuitive manipulating mechanism and can advantageously provide a realistic effect to a user.

However, according to the body motion tracking mechanism, only if a predetermined body motion exists irrespective of an environment or condition related to a use of a wearable device, it can be limitedly recognized as a valid or necessary input.

SUMMARY OF THE INVENTION

Accordingly, embodiments of the present invention are directed to a head mounted display (HMD) and method for controlling the same that substantially obviate one or more problems due to limitations and disadvantages of the related art.

One object of the present invention is to provide a head mounted display and method for controlling the same, which can provide a tracking sensitivity according to a use environment of the head mounted display.

Another object of the present invention is to provide a head mounted display and method for controlling the same, which can provide a tracking sensitivity according to a content outputted by the head mounted display.

Further object of the present invention is to provide a head mounted display and method for controlling the same, which can provide information on an external event, recognized according to a use environment of the head mounted display and a content outputted from the head mounted display.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a head mounted display according to one embodiment of the present invention may include a display, a sensor module configured to sense a motion, and a controller configured to obtain a use environment information of a user wearing the head mounted display, determine a use environment of the head mounted display based on the obtained use environment information, and adjust the motion of the user wearing the head mounted display based on the determined use environment.

The head mounted display may further include a camera configured to capture an image, and the controller may determine the use environment based on the image captured by the camera.

The controller may recognize an external event for the user wearing the head mounted display based on the determined use environment and the image captured by the camera and output information on the recognized external event to the display.

The head mounted display may further include a microphone configured to obtain a sound, and the controller may determine the use environment based on the sound obtained by the microphone.

The controller may recognize an external event for the user wearing the head mounted display based on the determined use environment and the sound obtained by the microphone and output information on the recognized external event to the display.

The head mounted display may further include a location information module configured to obtain a current location, and the controller may determine the use environment based on the current location obtained by the location information module.

The controller may recognize content outputted to the display and adjust the tracking sensitivity based on the recognized content.

The controller may adjust a plurality of tracking sensitivities for motions in a plurality of directions of the user wearing the head mounted display, respectively.

The controller may recognize the motion of the user sensed by the sensor module based on the adjusted tracking sensitivity and control an image corresponding to the recognized motion to be outputted to the display.

The controller may adjust the tracking sensitivity for a current location or a currently outputted content based on a tracking sensitivity pattern set by the user for a specific place or a specific content.

In another aspect of the present invention, as embodied and broadly described herein, a method of operating a head mounted display according to one embodiment of the present invention may include obtaining a use environment information of a user wearing the head mounted display, determining a use environment of the head mounted display based on the obtained use environment information, and adjusting a motion of the user wearing the head mounted display based on the determined use environment.

The obtaining the user environment information may include capturing an image and the determining the use environment may include determining the use environment based on the captured image.

The method may further include recognizing an external event for the user wearing the head mounted display based on the determined use environment and the captured image and outputting information on the recognized external event.

The obtaining the use environment information may include obtaining a sound and the determining the use environment may include determining the use environment based on the obtained sound.

The method may further include recognizing an external event for the user wearing the head mounted display based on the determined use environment and the obtained sound and outputting information on the recognized external event.

The obtaining the use environment information may include obtaining a current location and the determining the use environment may include determining the use environment based on the obtained current location.

The method may further include recognizing a content outputted to the display and adjusting the tracking sensitivity based on the recognized content.

The adjusting the tracking sensitivity may include adjusting a plurality of tracking sensitivities for motions in a plurality of directions of the user wearing the head mounted display, respectively.

The method may further include recognizing the motion of the user based on the adjusted tracking sensitivity and outputting an image corresponding to the recognized motion.

The method may further include adjusting the tracking sensitivity for a current location or a currently outputted content based on a tracking sensitivity pattern set by the user for a specific place or a specific content.

Accordingly, embodiments of the present invention provide various effects and/or features.

First of all, a head mounted display according to an embodiment of the present invention provides a tracking sensitivity according to user's use environment, thereby enhancing user's head mounted display usability.

And, the present invention provides a tracking sensitivity according to a content outputted by a head mounted display, thereby enhancing user's convenience.

Moreover, the present invention provides information on an external event according to user's use environment and an outputted content to a user currently wearing a head mounted display, thereby efficiently indicating external event information without interrupting user's head mounted display use.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
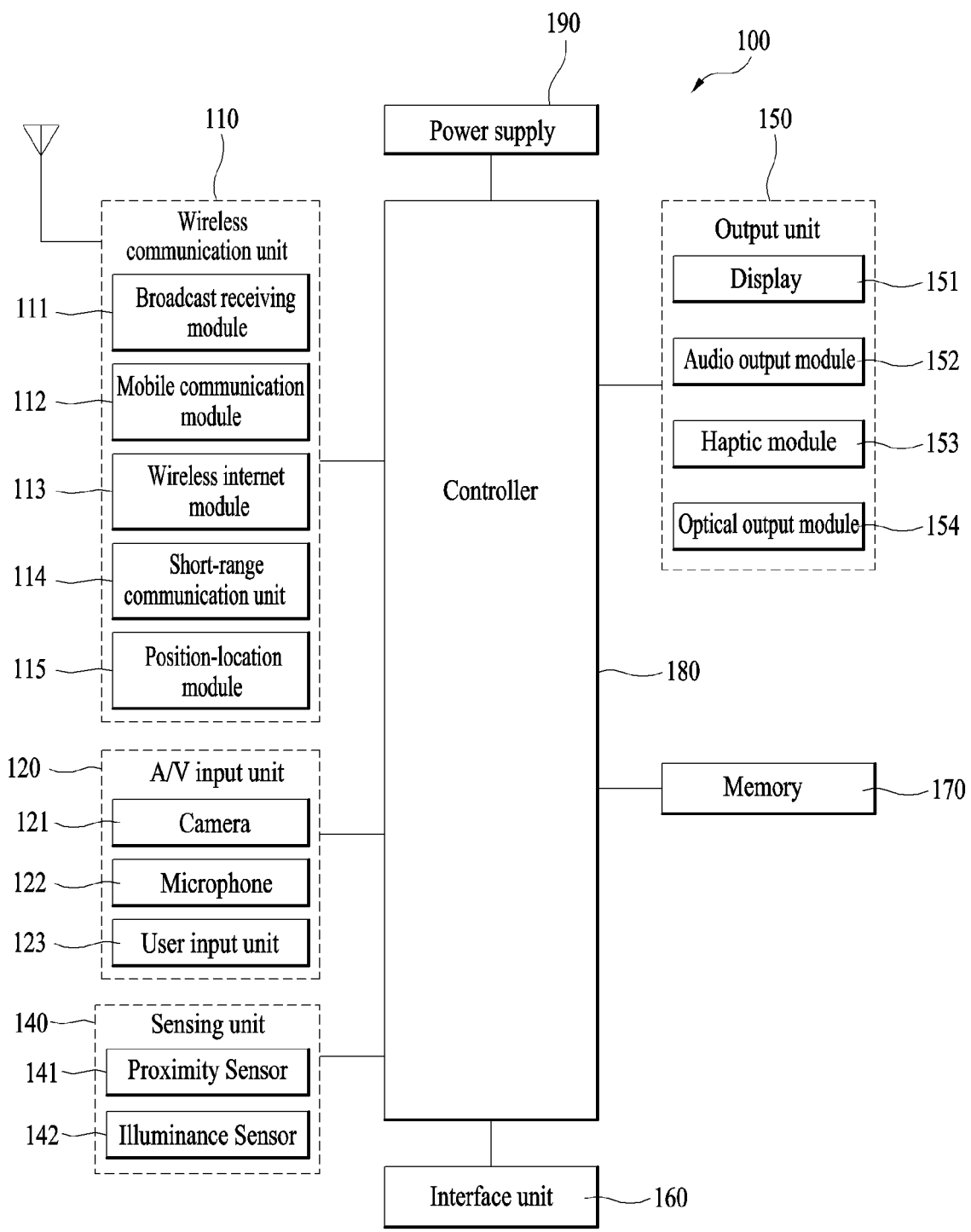
FIG. 1 is a block diagram to describe a terminal related to the present invention.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
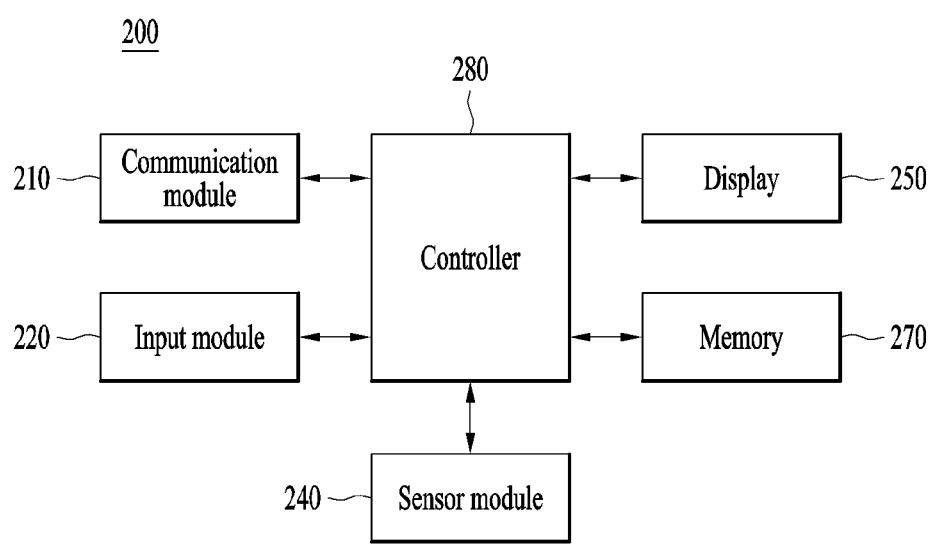
FIG. 2 is a block diagram to describe a head mounted display related to the present invention.

FIG. 2 is a block diagram to describe a head mounted display related to the present invention.

Referring to FIG. 2, a head mounted display 200 may include a communication module 210, an input module 220, a sensor module 240, a display 250, a memory 270 and a controller 280. Some of the components included in the head mounted display 200 may be removed or other components may be further included therein. The head mounted display 200 may include the former terminal 100, whereby some of the components of the former terminal 100 may be included in the head mounted display 200.

The communication module 210 may include at least one module configured to enable a wired/wireless communication between the head mounted display 200 and a wireless/wired communication system, between the head mounted display 200 and the terminal 100, or between the head mounted display 200 and an external server. And, the communication module 210 may correspond to the former wireless communication unit 110.

The input module 220 may include a camera 221 or a video input unit for an image or video signal input, a microphone 222 or an audio input unit for an audio signal input, and a user input module 223 (e.g., a touch key, a push (or mechanical) key, etc.) configured to receive an input of information from a user. Audio or image data collected by the input module 220 may be analyzed and processed into user's control command. The input module 220 may correspond to the former input unit 120.

The camera 221 may process image frames of a still image or video obtained by an image sensor. The camera 221 may capture an image of surroundings of the head mounted display 200. The head mounted display 200 may be provided with one or more cameras 221 and can capture images in one or all directions. And, the camera 221 may correspond to the former camera 121.

The microphone (hereinafter abbreviated 'mic') 222 may process an external sound signal into electric audio data. Various noise cancellation algorithms for cancelling noise generated in the course of receiving an input of an external sound signal may be implemented in the microphone 222. The microphone 222 may correspond to the former microphone 122.

The user input module 223 may be configured to receive an input of information from a user. If information is inputted through the user input module 223, the controller 280 may control an operation of the head mounted display 200 to correspond to the inputted information. The user input module 223 may include a mechanical input means (or a mechanical key) (e.g., a button located on a front and/or rear surface or a lateral surface of the head mounted display 200, a dome switch, a jog wheel, a jog switch, etc.) and a touch-sensitive input means. The user input module 223 may correspond to the former user input unit 123.

The sensor module 240 may include at least one sensor configured to sense at least one of information in the head mounted display, surrounding environment information around the head mounted display and user information. For instance, the sensor module 240 may include at least one of a proximity sensor, an illumination sensor, a touch sensor, an acceleration sensor, a magnetic sensor, a gravity sensor (G-sensor), a gyroscope sensor, a motion sensor, an RGB sensor, an IR (infrared) sensor, a fingerprint recognition (or finger scan) sensor, an ultrasonic sensor, an optical sensor, a microphone, a battery gauge, an environment sensor (e.g., barometer, hygrometer, thermometer, radioactivity detecting sensor, heat detecting sensor, gas detecting sensor, etc.), a chemical sensor (e.g., e-nose, healthcare sensor, biometric sensor, etc.) and the like. Meanwhile, the head mounted display 200 disclosed in the present specification may utilize combinations of informations sensed by at least two of the above-listed sensors.

The sensor module 240 may sense various motions of the head mounted display 200. For instance, the sensor module 240 may sense a motion of a user currently wearing the head mounted display 200. Hence, the sensor module 240 can sense a motion of a head of the user currently wearing the head mounted display 200.

The display 250 may display (or output) information processed by the head mounted display 200. And, the display unit 251 may output an image or video transmitted from a terminal 100 connected to the head mounted display 200 by wire/wireless. For one example, the display 250 may output an image or video corresponding to augmented reality, virtual reality, or mixed reality. Hence, the head mounted display 200 may be an open-view type for enabling a user to view both a real object and a virtual reality image together or a closed-view type for enabling a user to view a virtual reality image only.

The display 250 may output a 3D stereoscopic image.

The display 250 may include a lens, a projected plane, a projector and/or a prism. And, the display 250 may include a transparent display unit.

The display 250 may be configured to be disposed in front of eyes of a user wearing the head mounted display 200.

The display 250 may correspond to the former display 151.

The memory 270 can store data supportive of various functions of the head mounted display 200. For instance, the memory 270 can store data related to an operation of the head mounted display 200 and may also store data of a content outputted from the head mounted display 200. The memory 270 may correspond to the former memory 170.

The controller 280 may control an operation related to an application program and overall operations of the head mounted display 200. And, the controller 280 can control other components included in the head mounted display 200. For instance, the controller 280 can control other components included in the head mounted display 200 to output a transmitted image or video through the display 250. The controller 280 may launch various applications by processing data included in the head mounted display 200. The controller 280 may correspond to the former controller 180.

The head mounted display 200 may further include an audio module (not shown) configured to output audio data. The audio module may output audio related to a content outputted from the display 250, and may also output various audios related to operations of the head mounted display 200.

Figure 3:
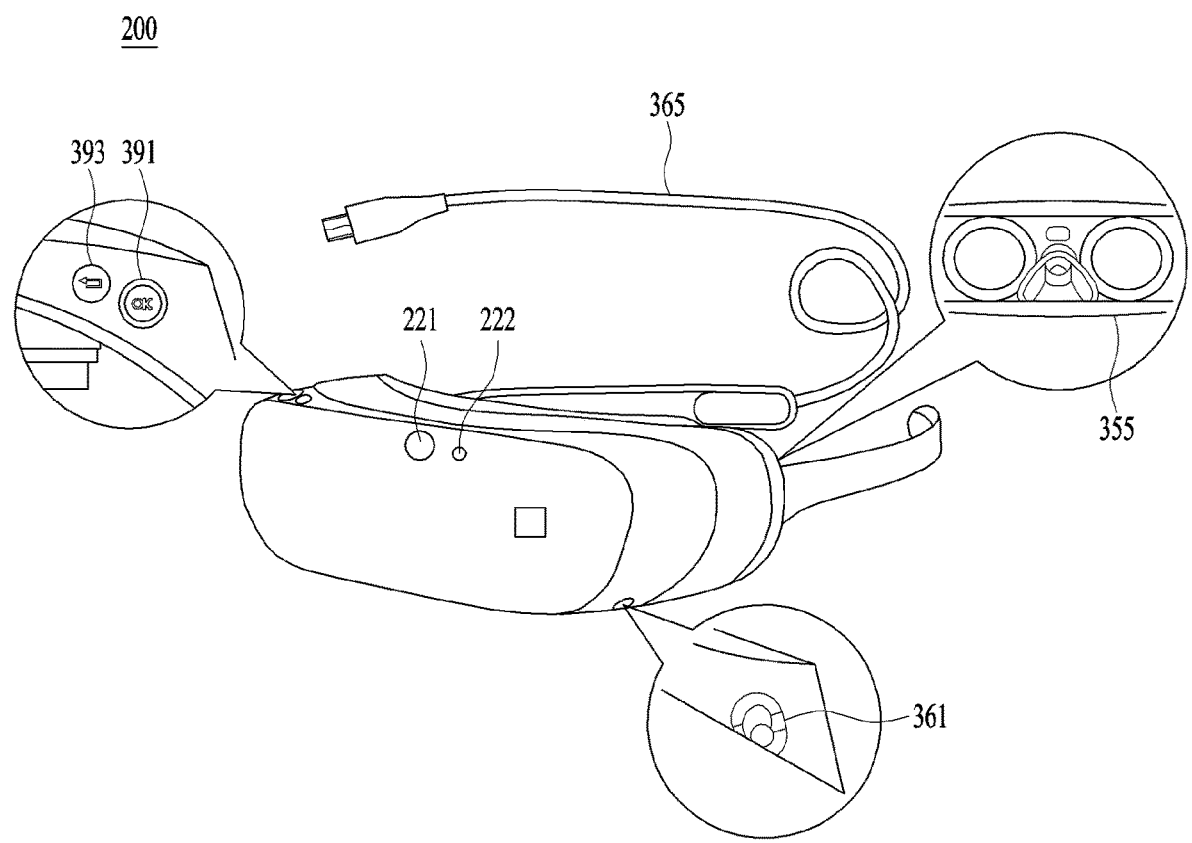
FIG. 3 is a diagram for an exterior of a head mounted display according to various embodiments of the present invention.

FIG. 3 shows an exterior of a head mounted display according to one embodiment of the present invention.

Referring to FIG. 3, a head mounted display 200 may be a type of glasses to be worn on a user's head by the user. The head mounted display 200 shown in FIG. 3 is one example only, and can be configured in such a head-wearable shape as a helmet type, a hat type, a goggle type or the like as well as in a glass type.

The head mounted display 200 may be provided with a lens 355 disposed at positions corresponding to user's eyes.

The lens 355 may include a left lens and a right lens, and at least one of locations and focuses of the left and right lenses are adjustable.

The head mounted display 200 may include an audio port 361 configured to transmit audio externally. Hence, an audio of a content outputted from the head mounted display 200 may be forwarded to an external device through the audio port 361.

The head mounted display 200 may include a cable 365 configured to connect to an external device. For one example, the head mounted display 200 may be connected to a terminal 100 through the cable 365. Hence, the head mounted display 200 may receive data of image/video and audio, which will be outputted, from the terminal 100 through the cable 365. And, the head mounted display 200 may be supplied with power from the connected terminal 100 through the cable 365. Cables of various specifications may be applicable to the cable 365. For instance, the cable 365 may include a USB (universal serial bus) cable or a capable supportive of independent specification.

The head mounted display 200 may be provided with a camera 221 and a microphone 222 in front direction. And, the head mounted display 200 may be provided with a camera 221 and/or a microphone 222 in other directions as well as in the front direction. Moreover, the head mounted display 200 may be provided with a plurality of cameras 221 and a plurality of microphones 222.

The head mounted display 200 may include at least one key related to a function or operation. For instance, the head mounted display 200 may include a confirm button 391 and a previous button 393. The confirm button 391 may be a button for an input for a selection or decision, and the previous button 393 may be a button for an input of 'cancel' or 'backward'. Moreover, the confirm button 391 and the previous button 393 may include buttons for various input according to function or operations of the head mounted display 200 or buttons for various inputs according to launched applications. The head mounted display 200 may include an external video button for capturing an external video through the camera 221 and outputting the captured video to the display 250. And, the head mounted display 200 may include a tracking sensitivity adjust button for adjusting a tracking sensitivity of tracking a motion of a user wearing the head mounted display 200. This shall be described later.

Figure 4:
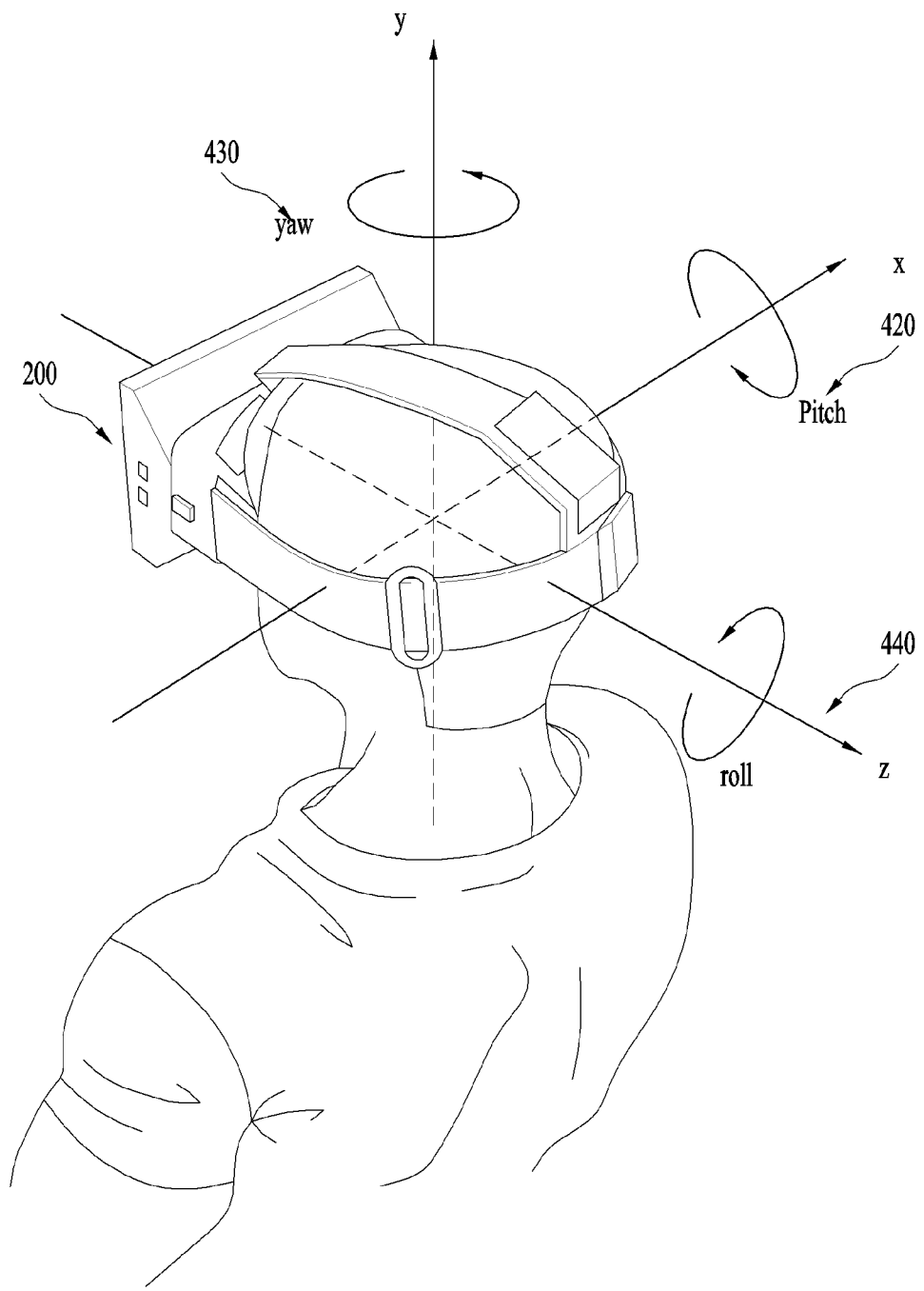
FIG. 4 is a diagram for an example of a motion of a user wearing a head mounted display according to various embodiments of the present invention.

FIG. 4 is a diagram for an example of a motion of a user wearing a head mounted display according to various embodiments of the present invention.

Referring to FIG. 4, a motion of a user wearing a head mounted display 200 may be represented as a motion for a 3D center of each of a pitch 420, a yaw 430 and a roll 440 centering on a head of the user. In the 3D (3-dimensional) coordinate system, the pitch 420, the yaw 430 and the roll 440 may be an x-axis rotation, a y-axis rotation and a z-axis rotation, respectively. A sensor module 440 of the head mounted display 200 can sense a motion for each of the pitch 420, the yaw 430 and the roll 440. Hence, the controller 280 of the head mounted display 200 can recognize a motion of a user wearing the head mounted display 200.

The head mounted display 200 according to various embodiments of the present invention can recognize a use environment and adjust a tracking sensitivity to correspond to the recognized use environment. The head mounted display 200 may adjust a tracking sensitivity according to an outputted content, and also adjust a tracking sensitivity according to a recognized environment and an outputted content. Based on user's use pattern, the head mounted display 200 can adjust a tracking sensitivity according to a recognized use environment and an outputted content. The head mounted display 200 may recognize an external event and output an alarm of the recognized external event according to at least one of a recognized use environment and an outputted content. This is described in detail as follows.

Figure 5:
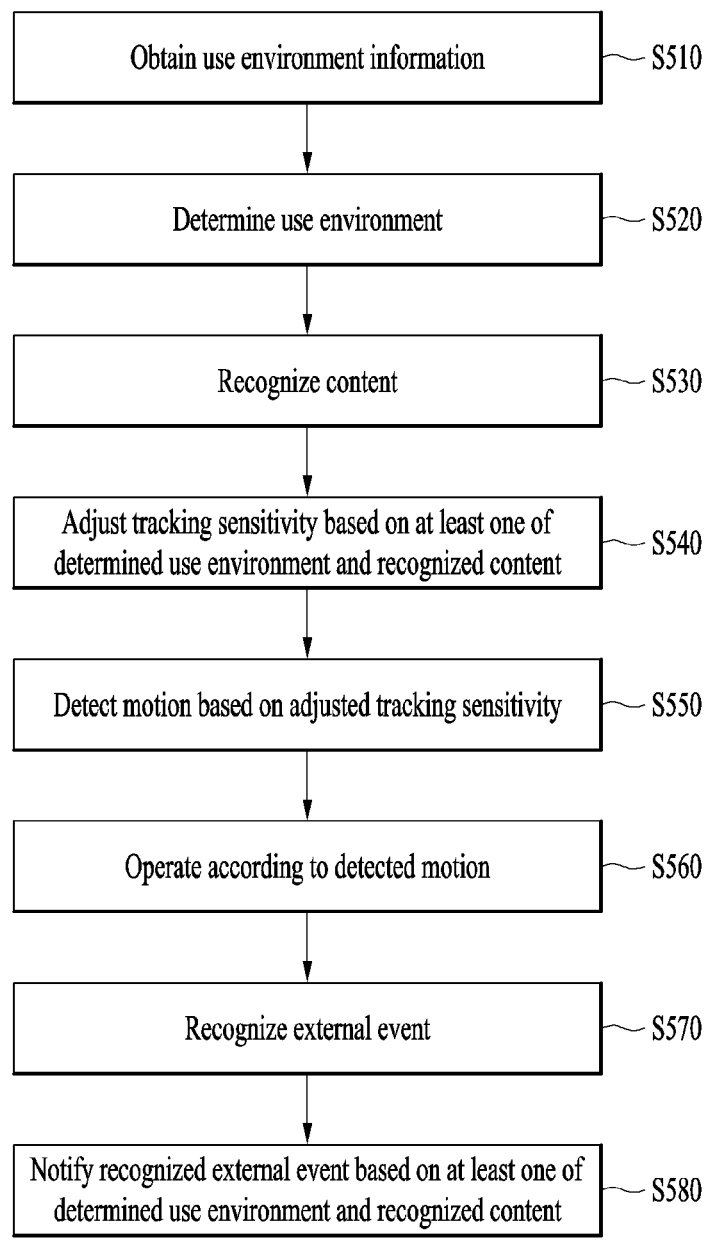
FIG. 5 is a flowchart for an operation of a head mounted display according to various embodiments of the present invention.

FIG. 5 is a flowchart for an operation of a head mounted display according to various embodiments of the present invention.

Referring to FIG. 5, the head mounted display 200 may obtain use environment information [S510].

The head mounted display 200 may obtain use environment information related to a use environment in which the head mounted display 200 is used.

For instance, the controller 280 may obtain an image of a surrounding environment through the camera 221 of the head mounted display 200.

For another instance, the controller 280 may obtain a surrounding sound through the microphone 222.

For another instance, the controller 280 may obtain location information on a current location of the head mounted display 200. In particular, the head mounted display 200 may include a location information module (not shown) and is able to obtain a current location of the head mounted display 200 through the location information module. Herein, the location information module may correspond to the former location information module 115. For one example, the head mounted display 200 can obtain a current location through a GPS or WiFi module included in the location information module. For another example, the head mounted display 200 may obtain a current location based on information of a cell currently communicating with the wireless communication unit 210.

For another instance, the controller 280 may obtain information on slope, acceleration, gravity and the like through the sensor module 240.

The head mounted display 200 may determine a use environment based on the obtained use environment information [S520].

For instance, based on the obtained use environment information, the head mounted display 200 can determine whether an environment in which the head mounted display 200 is used is a free motion available environment. Particularly, based on the obtained use environment information, the head mounted display 200 can determine whether the corresponding environment is an environment in which a user wearing the head mounted display 200 can make a big motion or an environment in which the user can make a small motion only. Herein, the big or small motion may mean a motion level of a body motion of the user wearing the head mounted display 200. Particularly, the environment in which a free motion of the user wearing the head mounted display 200 is available can be determined with reference to an abstract space as well as a physical space. For instance, the environment in which the free motion of the user wearing the head mounted display 200 is available may include a space free from conceptual or ideological restrictions such as surrounding people's eyes, space sharing with surrounding people, manners, rules and the like as well as an environment having a sufficient physical space (e.g., distance, area, etc.) in which a body motion of the user wearing the head mounted display 200 can be freely made. Therefore, the head mounted display 200 may determine a presence or non-presence of a free motion available environment according to relationship, acquaintance or the like between a user wearing the head mounted display 200 and another person located in a predetermined space as well as a presence or non-presence of a sufficient physical space. This shall be described later.

Based on the obtained use environment information, the head mounted display 200 may determine whether the environment in which the head mounted display 200 is used is user's private space or user's public space. Herein, the private space may mean the aforementioned physically free space, e.g., a space having low possibility of collision with another person owing to enabling a user's free motion despite that the user wearing the head mounted display 200 moves. The private space may include the aforementioned conceptually free space, e.g., a space in which the user wearing the head mounted display 200 is free from other people's eyes. And, the public space may include a limited space that is not physically free. For instance, the public space may include a space in which user's limited motion can be made only. And, the public space may include a space in which possibility of collision with another person is high if a user wearing the head mounted display 200 moves. The public space may include a space that is not conceptually free, e.g., a space in which a user wearing the head mounted display 200 is not free from other people's eyes. And, the public space may be called an external space.

For one example, based on a shot image corresponding to the obtained use environment information, the controller 280 may recognize a surrounding environment. For instance, if a shot image is user's house, the controller 280 may determine that a use environment of the head mounted display 200 is a private space and also determine that a user wearing the head mounted display 200 can make a body motion freely in the corresponding environment. For another instance, if a multitude of other people are contained in a shot image, the controller 280 may determine that it is a public space and also determine that a user wearing the head mounted display 200 can make a limited body motion only in the corresponding environment.

Based on a shot image, the controller 280 recognizes other persons located in a recognized space and may determine whether the recognized space is an environment in which a user wearing the head mounted display 200 can make a free body motion. For instance, based on a shot image, if at least one person is located around the user wearing the head mounted display 200, the controller 280 may determine that it is a physically or conceptually not-free space. Yet, the controller 280 may recognize a face of another person around. If the recognized person has an acquaintance with a person wearing the head mounted display 200 or a relationship conceptually free from the person wearing the head mounted display 200, the controller 280 may determine that the user wearing the head mounted display 200 can freely move in the corresponding space despite that the user is not physically or conceptually free in part. Particularly, based on various informations stored in the memory 270, the controller 280 may recognize another person and determine relationship, acquaintance and the like with a user. For instance, based on information saved to a contact and an image saved to a gallery, the controller 280 may recognize another person and determine a relationship between the recognized person and a user. For one example, if a character contained in a shot image is a character contained in an image saved to a gallery, the controller 280 may determine a current space in which the corresponding character is located as an environment in which a free body motion is possible. For another example, if a character contained in a shot image is a character saved to a contact, the controller 280 may determine a current space in which the corresponding character is located as an environment in which a free body motion is possible. For further example, based on an image saved to a gallery and information saved to a contact, the controller 280 may determine that a character contained in a shot image has an intimate relationship with a user wearing the head mounted display 200 and also determine a current space in which the character in the intimate relationship is located as an environment in which a free body motion is possible. Thus, based on a saved image, a user information and the like, the head mounted display 200 may recognize a close character and determine a relationship and acquaintance with the recognized character. Based on the determined relationship and acquaintance, the head mounted display 200 can determine a use environment.

For another example, based on an obtained sound, the controller 280 may recognize a surrounding environment. For instance, if a noise level of an obtained sound is equal to or higher than a predetermined reference, the controller 280 may recognize a surrounding environment as an external space and determine that the recognized space is a space in which a user wearing the head mounted display 200 can make a limited motion only. For another instance, based on a word contained in an obtained sound, e.g., a name or a title, the controller 280 may determine a surrounding environment. For instance, based on a name for calling a user currently using the head mounted display 200, the controller 280 may determine a surrounding environment.

Based on an obtained sound, the controller 280 recognizes other persons located in a recognized space and may determine whether the recognized space is an environment in which a user wearing the head mounted display 200 can make a free body motion. For instance, based on an obtained sound, if at least one person is located around the user wearing the head mounted display 200, the controller 280 may determine that it is a physically or conceptually not-free space. Yet, the controller 280 may recognize a voice of another person around. If the recognized person has an acquaintance with a person wearing the head mounted display 200 or a relationship conceptually free from the person wearing the head mounted display 200, the controller 280 may determine that the user wearing the head mounted display 200 can freely move in the corresponding space despite that the user is not physically or conceptually free in part. Herein, based on various voices saved to the memory 270, the controller 280 may recognize another person and determine a relationship between the recognized person and a user.

For another example, based on an obtained current location, the controller 280 may determine a use environment of the head mounted display 200. For instance, if an obtained current location is user's office, the controller 280 may determine that the use environment is an environment in which a user wearing the head mounted display 200 has difficult in making a big motion. For another instance, if an obtained current location is user's house, the controller 280 may determine that the use environment is an environment in which a user wearing the head mounted display 200 can make a free body motion.

For another example, based on an obtained information on slope, acceleration, gravity and the like, the controller 280 may determine that a user wearing the head mounted display 200 is on a transportation means.

Based on user's use history or pattern, the head mounted display 200 may adjust a tracking sensitivity. For instance, the head mounted display 200 may set a tracking sensitivity having been set over a predetermined count at a specific place as a tracking sensitivity at the corresponding place. Hence, based on a current location, the head mounted display 200 may automatically set a tracking sensitivity according to user's tracking sensitivity setting pattern at the corresponding location.

Moreover, based on user's use history and pattern, the head mounted display 200 may adjust a tracking sensitivity according to a determined use environment and an outputted content described later. For instance, the head mounted display 200 may set a tracking sensitivity set for a specific content or a specific content category by a user over a predetermined count as a tracking sensitivity for the corresponding content or the corresponding content category. Hence, the head mounted display 200 may adjust a tracking sensitivity into the tracking sensitivity set for a specific location or content by a user over a predetermined count. Based on a combination for a location and content, the head mounted display 200 may adjust a tracking sensitivity into a tracking sensitivity set by a user over a predetermined count. Hence, as mentioned in the foregoing description, the head mounted display 200 may adjust a tracking sensitivity in further consideration of user's tracking sensitivity adjustment history as well as the determined use environment. As the head mounted display 200 can preferentially consider the user's tracking sensitivity adjustment history rather than the determined use environment, if the head mounted display 200 is located at a specific place, the head mounted display 200 may adjust the corresponding tracking sensitivity into the tracking sensitivity adjusted or set by a user at the corresponding place over the predetermined count.

Thus, based on the obtained use environment information, the head mounted display 200 can determine the use environment of the head mounted display 200.

The head mounted display 200 may recognize an outputted content [S530].

The head mounted display 200 can recognize a content, which is or will be outputted to the display 250.

For instance, the head mounted display 200 may recognize a category of a content that is or will be outputted. For one example, the head mounted display 200 may recognize whether the outputted content is a content for the purpose of perception like a game content or a content for the purpose of appreciation like a movie content. For another example, the head mounted display 200 may recognize whether an outputted content, of which continuous output is important, is a content, of which content output pause is inappropriate.

Based on at least one of the determined use environment and the recognized content, the head mounted display 200 may adjust a tracking sensitivity [S540].

For instance, based on at least one of the determined use environment and the recognized content, the head mounted display 200 may adjust a sensitivity of a tracking of a motion of the user wearing the head mounted display 200.

For one example, the head mounted display 200 can adjust a tracking sensitivity to fit a determined use environment. For instance, if the controller 280 determines a use environment in which a user wearing the head mounted display 200 can make a free motion, the controller 280 can adjust a tracking sensitivity of tracking a user motion into the same tracking sensitivity of a motion on an outputted content. Herein, the same tracking sensitivity of the motion on the outputted content may include a default tracking sensitivity. For another instance, if the controller 280 determines a use environment in which a user wearing the head mounted display 200 can make a limited motion only, the controller 280 can adjust a motion of an outputted content to become bigger than a motion of the user wearing the head mounted display 200 by raising a tracking sensitivity of tracking a user motion to be higher than a basic tracking sensitivity. This is described with reference to FIG. 6.

Figure 6:
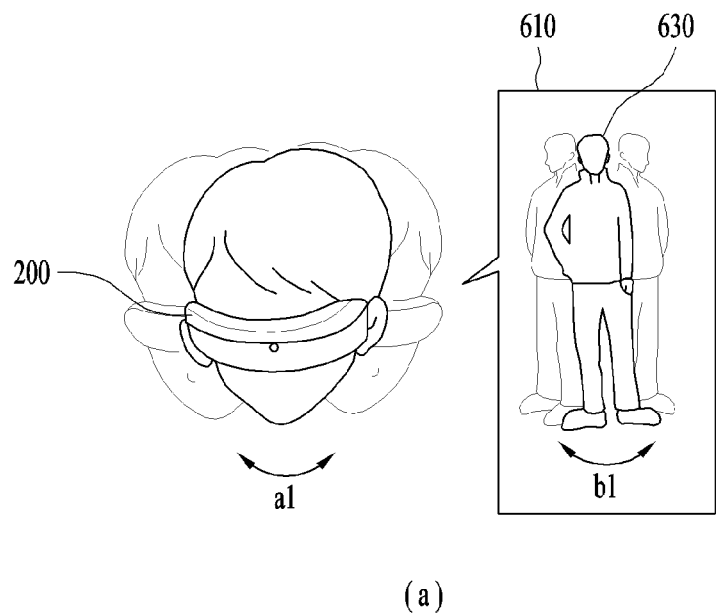
FIG. 6 is a diagram for an example of a tracking sensitivity adjustment depending on a use environment according to one embodiment of the present invention.
Figure 6:
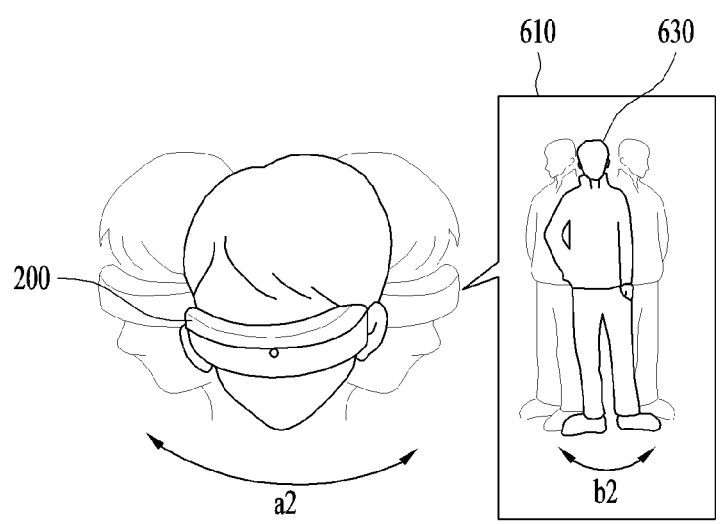

FIG. 6 is a diagram for an example of a tracking sensitivity adjustment depending on a use environment according to one embodiment of the present invention.

Referring to FIG. 6 (a), the controller 280 of the head mounted display 200 may determine that a determined use environment is a use environment in which a user wearing the head mounted display 200 is limited, e.g., an external space. As user's motion is limited in the external space, in order to prevent other people's eyes and not to damage surroundings, the controller 280 may raise a tracking sensitivity of tracking user's motion to become higher than a basic tracking sensitivity. For one example, if recognizing a first motion a1 that a user wearing the head mounted display 200 moves a head right and left, the controller 280 can adjust a tracking sensitivity so that a character on an outputted content 610 can move by a first motion b1. Hence, the head mounted display 200 can control the motion b1 on the outputted content to be bigger than the user's actual motion a1. Accordingly, even in a space in which a motion is not free, the user can use the head mounted display 200 with ease.

Referring to FIG. 6 (b), the controller 280 of the head mounted display 200 may determine that a determined use environment is a use environment in which a motion of a user wearing the head mounted display 200 is free, e.g., a private space. As a user can move freely in a private space, in order to maximize user's content immersion sense, the controller 280 may adjust a tracking sensitivity of tracking user's motion into a default tracking sensitivity. Herein, the default tracking sensitivity may mean a tracking sensitivity for equalizing a user's motion and a motion on an outputted content to each other. For one example, if recognizing a second motion a2 that a user wearing the head mounted display 200 moves a head right and left, the controller 280 can adjust a tracking sensitivity so that a character on an outputted content 610 can move by a second motion b2. Hence, the head mounted display 200 can control the user's actual motion a2 and the motion b2 on the outputted content to be equalized to each other.

The first motion b1 on the content shown in FIG. 6 (a) may be equal in size to the second motion b2 on content shown in FIG. 6 (b). Thus, as the head mounted display 200 can adjust the tracking sensitivity according to the determined use environment, although the first motion a1 and the second motion a2 are different from each other regarding user's motion, the head mounted display 200 can operate so that the same motions b1 and b2 can be outputted on the content.

For another example, the head mounted display 200 can adjust a tracking sensitivity to fit a recognized use environment. For instance, if a content, which is or will be outputted from the head mounted display 200, is a content of which realistic feel is important, the controller 280 can adjust a tracking sensitivity of tracking a user motion into the same tracking sensitivity of a motion on an outputted content. Herein, the same tracking sensitivity of the motion on the outputted content may include a default tracking sensitivity. For another instance, if a content, which is or will be outputted from the head mounted display 200, is a content of which appreciation is important, the controller 280 can adjust a motion of an outputted content to become bigger than a motion of the user wearing the head mounted display 200 by raising a tracking sensitivity of tracking a user motion to be higher than a basic tracking sensitivity. This is described with reference to FIG. 7.

Figure 7:
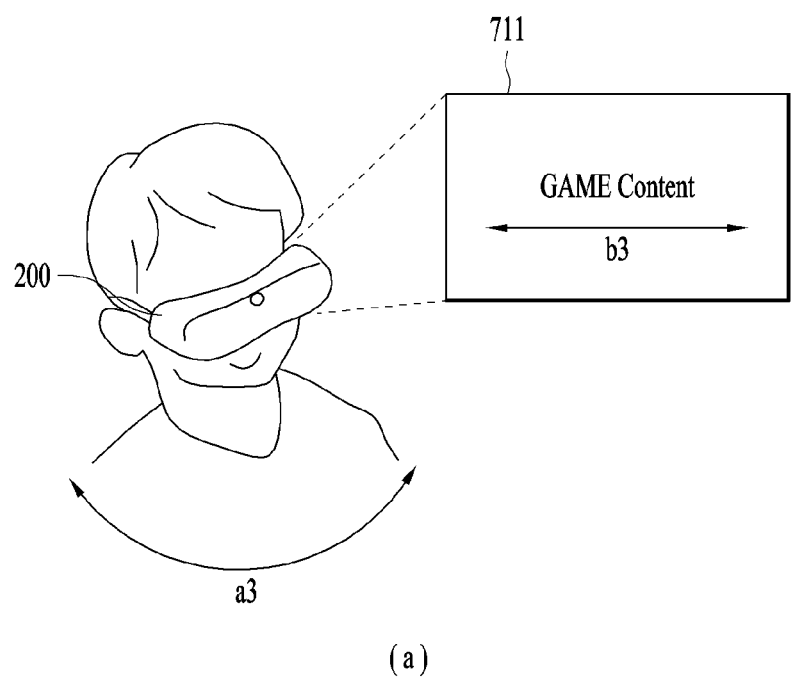
FIG. 7 is a diagram for an example of a tracking sensitivity adjustment depending on a recognized content according to one embodiment of the present invention.
Figure 7:
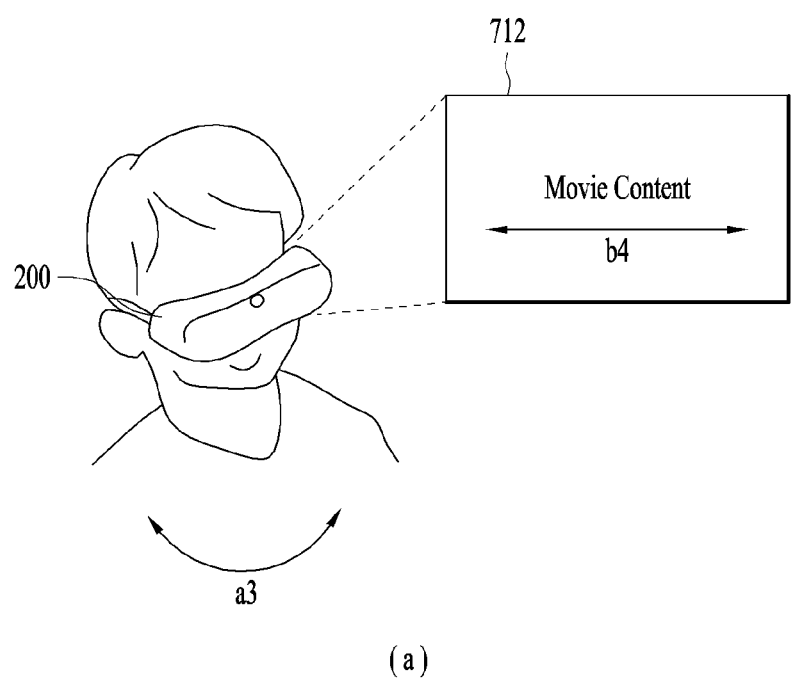

FIG. 7 is a diagram for an example of a tracking sensitivity adjustment depending on a recognized content according to one embodiment of the present invention.

Referring to FIG. 7 (a), the head mounted display 200 can output a game content 711. The head mounted display 200 may recognize the outputted game content and then adjust a tracking sensitivity into a tracking sensitivity corresponding to the recognized game content. For instance, in order to maximize user's content immersion sense, the controller 280 may adjust a tracking sensitivity of tracking user's motion into a default tracking sensitivity. Herein, the default tracking sensitivity may mean a tracking sensitivity for equalizing a user's motion and a motion on an outputted content to each other. For one example, if recognizing a third motion a3 that a user wearing the head mounted display 200 moves a head right and left, the controller 280 can adjust a tracking sensitivity so as to make a third motion b3 on the outputted game content 711. Herein, the user's actual third motion a3 and the third motion b3 on the game content may be the same motion.

Referring to FIG. 7 (b), the head mounted display 200 can output a movie content 712. The head mounted display 200 may recognize the outputted movie content and then adjust a tracking sensitivity into a tracking sensitivity corresponding to the recognized movie content. For instance, for user's comfort content appreciation, the controller 280 may adjust a tracking sensitivity of tracking user's motion to be more sensitive than a default tracking sensitivity. Herein, the sensitivity more sensitive than the default tracking sensitivity may include a tracking sensitivity adjusted to enable a motion on an outputted content to be bigger than an actual motion. For one example, if recognizing a fourth motion a4 that a user wearing the head mounted display 200 moves a head right and left, the controller 280 can adjust a tracking sensitivity so as to make a fourth motion b4 on the outputted movie content 712. Herein, the user's actual fourth motion a4 may be smaller than the fourth motion b4 on the movie content.

The third motion b3 on the game content shown in FIG. 7 (a) may be equal in size to the fourth motion b4 on the movie content shown in FIG. 7 (b). Thus, the head mounted display 200 can adjust a tracking sensitivity according to an outputted content, thereby providing a tracking sensitivity appropriate for the outputted content.

For another example, the head mounted display 200 can adjust a tracking sensitivity to fit a determined use environment and a recognized content. This is described with reference to FIG. 8.

Figure 8:
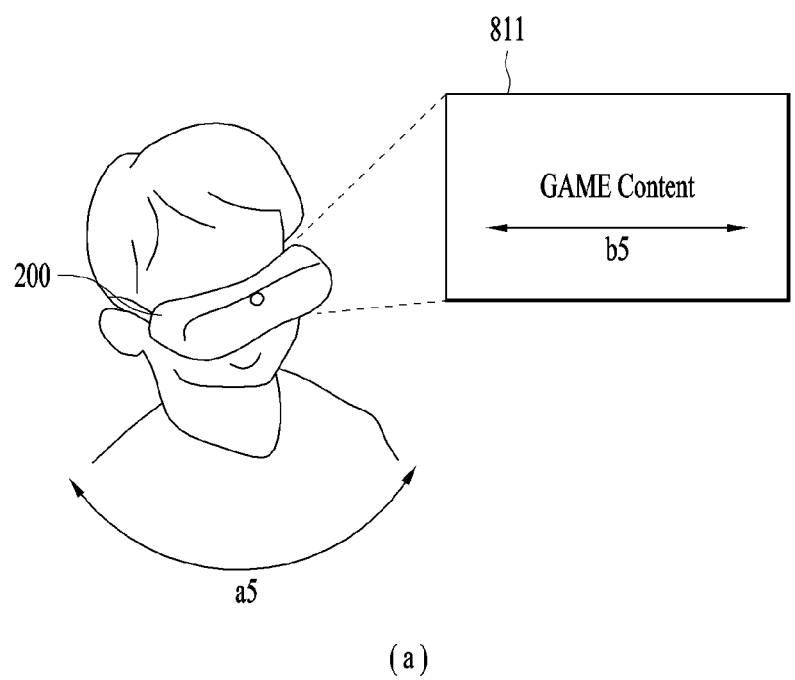
FIG. 8 is a diagram for an example of a tracking sensitivity adjustment depending on a use environment and an outputted content according to one embodiment of the present invention.
Figure 8:
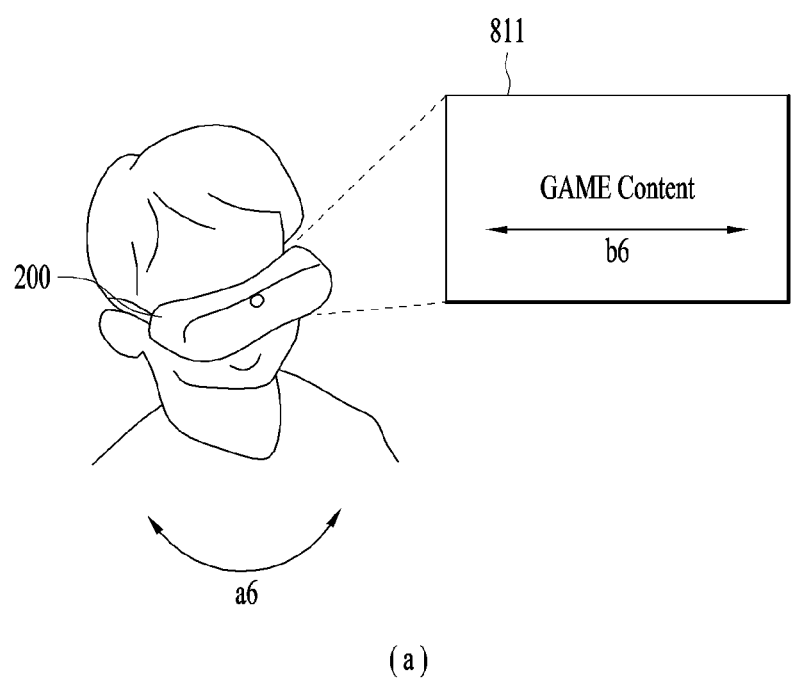

FIG. 8 is a diagram for an example of a tracking sensitivity adjustment depending on a use environment and an outputted content according to one embodiment of the present invention.

Referring to FIG. 8 (a), the head mounted display 200 can output a game content 811. The controller 280 of the head mounted display 200 may recognize the outputted game content. Based on obtained use environment information, the controller 280 of the head mounted display 200 may determine that it is a use environment in which a motion of a user wearing the head mounted display 200 is free, e.g., a private space. As a default tracking sensitivity is appropriate for the recognized game content to maximize user's content immersion sense and the determined use environment is the environment in which user's motion is free, the controller 280 may adjust the user's motion and a motion on the outputted content by the same default tracking sensitivity. For one example, if recognizing a fifth motion a5 that a user wearing the head mounted display 200 moves a head right and left, the controller 280 can adjust a tracking sensitivity so as to make a fifth motion b5 on the outputted game content 811. Herein, the user's actual fifth motion a5 and the fifth motion b5 on the game content may be the same motion.

Referring to FIG. 8 (b), the head mounted display 200 can output a game content 8112. The controller 280 of the head mounted display 200 may recognize the outputted game content. Based on obtained use environment information, the controller 280 of the head mounted display 200 may determine that it is a use environment in which a motion of a user wearing the head mounted display 200 is limited, e.g., an external space. Although a default tracking sensitivity is appropriate for the recognized game content to maximize user's content immersion sense, since the determined use environment is the environment in which user's motion is limited, the controller 280 may adjust a tracking sensitivity of tracking user's motion to be more sensitive than a default tracking sensitivity. For one example, if recognizing a sixth motion a6 that a user wearing the head mounted display 200 moves a head right and left, the controller 280 can adjust a tracking sensitivity so as to make a sixth motion b6 on the outputted game content 811. Herein, the user's actual sixth motion a6 may be smaller than the sixth motion b6 on the game content.

The fifth motion b5 on the game content shown in FIG. 8 (a) may be equal in size to the sixth motion b6 on the game content shown in FIG. 8 (b).

Thus, despite the same outputted content, the head mounted display 200 can adjust a tracking sensitivity according to a determined use environment, thereby providing a tracking sensitivity appropriate for the outputted content and the use environment.

As mentioned in the foregoing description, based on a tracking sensitivity set by a user for a specific content or a specific content category, the head mounted display 200 may adjust a tracking sensitivity for an outputted content. For instance, the head mounted display 200 may set a tracking sensitivity set by a user for a specific content or a specific content category over a predetermined count as a tracking sensitivity for the corresponding content or the corresponding content category. Hence, based on user's use history or pattern, the head mounted display 200 may automatically set a tracking sensitivity according to user's tracking sensitivity setting pattern for an outputted content.

Meanwhile, although the above embodiment is described centering on the contents for a motion in one direction, the head mounted display 200 according to various embodiments of the present invention may adjust tracking sensitivities into different tracking sensitivities for motions in various directions tracked by the head mounted display 200, respectively. For instance, the head mounted display 200 may adjust a tracking sensitivity in top-bottom direction and a tracking sensitivity in right-left direction differently. And, the head mounted display 200 may have different tracking sensitivities set for a plurality of directions, respectively. This is described with reference to FIG. 9.

Figure 9:
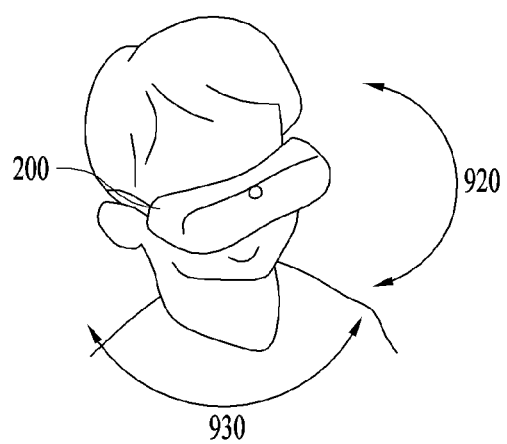
FIG. 9 is a diagram for an example of a tracking direction according to one embodiment of the present invention.

FIG. 9 is a diagram for an example of a tracking direction according to one embodiment of the present invention.

Referring to FIG. 9, the head mounted display 200 may track a top-bottom directional motion 920 and a right-left directional motion 930 and also adjust a tracking sensitivity of the top-bottom directional motion 920 and a tracking sensitivity of the right-left directional motion 930 differently. For instance, the controller 280 adjusts the top-bottom directional motion 920 to be more sensitive than a default tracking sensitivity, thereby adjusting a tracking sensitivity so that a motion on an outputted content can be bigger than an actual motion. The controller 280 adjusts the right-left directional motion 930 into the default tracking sensitivity, thereby adjusting a tracking sensitivity so that an actual motion and a motion on an outputted content can be equal to each other. Thus, the head mounted display 200 can differently adjust a tracking sensitivity according to a tracking direction. Therefore, the head mounted display 200 may adjust each of a plurality of tracking directions to have a different tracking sensitivity according to a determined use environment or a recognized content.

Based on user's use history or pattern, the head mounted display 200 can adjust a plurality of tracking directions to have different tracking sensitivities, respectively. For instance, based on user's use history or pattern, the head mounted display 200 can differently adjust a tracking sensitivity for one direction to differ from that for another direction. For one example, based on user's use history or pattern, the controller 280 of the head mounted display 200 adjusts a tracking sensitivity for a right-left direction to be more sensitive than a default tracking sensitivity and also adjusts a tracking sensitivity for a top-bottom direction into the default tracking sensitivity.

FIG. 5 is referred to again.

Referring to FIG. 5, based on the adjusted tracking sensitivity, the head mounted display 200 may detect a user motion [S550] and operate according to the detected motion [S560].

Based on the adjusted tracking sensitivity, the controller 280 of the head mounted display 200 may detect a motion of a user wearing the head mounted display 200. For instance, based on the adjusted tracking sensitivity, the controller 280 can detect a head motion of the user or a motion of the user who is moving, through the sensor module 240.

In response to the detected motion, the controller 280 of the head mounted display 200 may perform an operation related to a content outputted to the display 250. For instance, if detecting a motion of moving in a prescribed direction, the controller 280 can output an image moved in the prescribed direction to the display 250. For another instance, if detecting a motion of moving eyes in a prescribed direction, the controller 280 can output an image resulting from moving the eyes in the prescribed direction to the display 250.

Thus, as mentioned in the foregoing description, the head mounted display 200 can detect a motion of a user wearing the head mounted display 200 with a tracking sensitivity adjusted based on at least one of a determined use environment and a recognized content, thereby operating in response to the detected motion.

The head mounted display 200 may recognize an external event [S570].

The head mounted display 200 may recognize an external event occurring around a user wearing the head mounted display 200. Herein, the external event may mean an event supposed to be recognized by the user wearing the head mounted display 200 or an event requiring an interaction with the user wearing the head mounted display 200.

For one example, the head mounted display 200 may recognize a thing or person approaching a user wearing the head mounted display 200.

Figure 10:
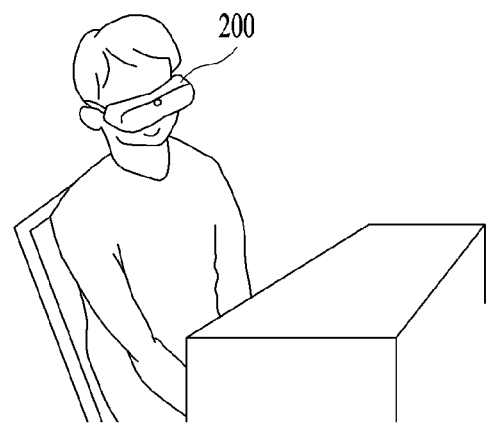
FIG. 10 is a diagram for an example of an approaching person recognition according to one embodiment of the present invention.
Figure 10:
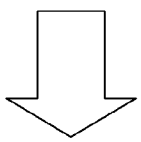
Figure 10:
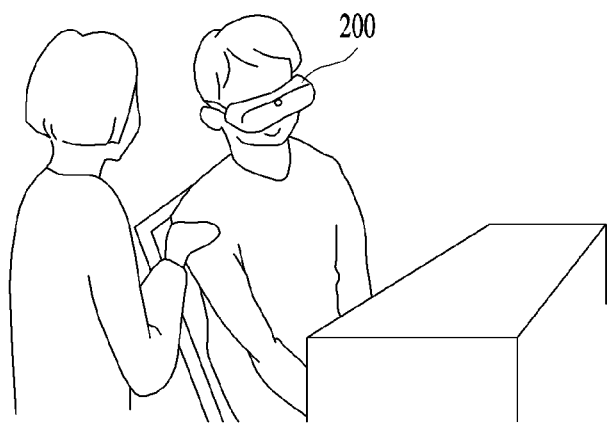

FIG. 10 is a diagram for an example of an approaching person recognition according to one embodiment of the present invention.

Referring to FIG. 10, a user wearing the head mounted display 200 may sit at a specific location and may be appreciating a content outputted through the head mounted display 200. When another person approaches the user wearing the head mounted display 200, the head mounted display 200 can recognize the approaching person. For instance, based on at least one of the camera 221, the microphone 222 and the sensor module 240, the head mounted display 200 can recognize the approaching person. For one example, the controller 280 can recognize the approaching person based on an image captured by the camera 221. Particularly, based on a size change of a person contained in the captured image, the controller 280 can recognize the approaching person. For another example, based on a sound obtained by the microphone 222, the controller 280 can recognize the approaching person. For further example, based on information sensed by the sensor module 240, the controller 280 can recognize the approaching person. For instance, based on information sensed by at least one of the IR sensor, the ultrasonic sensor, the optical sensor, the illumination sensor and the proximity sensor included in the sensor module 240, the controller 280 can recognize the approaching person. Thus, the head mounted display 200 can recognize an external event such as an approaching person.

For another example, the head mounted display 200 can recognize an external event according to a detected sound. For one example, based on a sound obtained through the microphone 222, the head mounted display 200 can detect a sound containing a specific word, e.g., a sound of calling a user wearing the head mounted display 200 and then recognize an external event according to the detected sound. For another example, based on a sound obtained through the microphone 222, the head mounted display 200 can detect a specific sound such as a bell sound, an alarm sound and the like and then recognize an external event according to the detected sound.

FIG. 5 is referred to again.

The head mounted display 200 may indicate the recognized external event based on at least one of the determined use environment and the recognized content [S580].

Based on at least one of the determined use environment and the recognized content, the controller 280 of the head mounted display 200 may output an image or video for indicating the recognized external event to the display 250 and also output an audio for indicating the external event to the audio module.

The controller 280 of the head mounted display 200 may indicate the recognized external event according to the determined use environment. For instance, when the determined use environment is a private space such as a house, if another person approaches in a range of 1 meter around a user wearing the head mounted display 200, the controller 280 can output an alarm for the approaching person through the display 250 or the audio module. For another instance, when the determined use environment is an external space such as a company, if another person approaches in a range of 3 meters around a user wearing the head mounted display 200, the controller 280 can output an alarm for the approaching person through the display 250 or the audio module.

The controller 280 of the head mounted display 200 may output an image or video according to a recognized external event depending on a determined use environment to the display 250.

Figure 11:
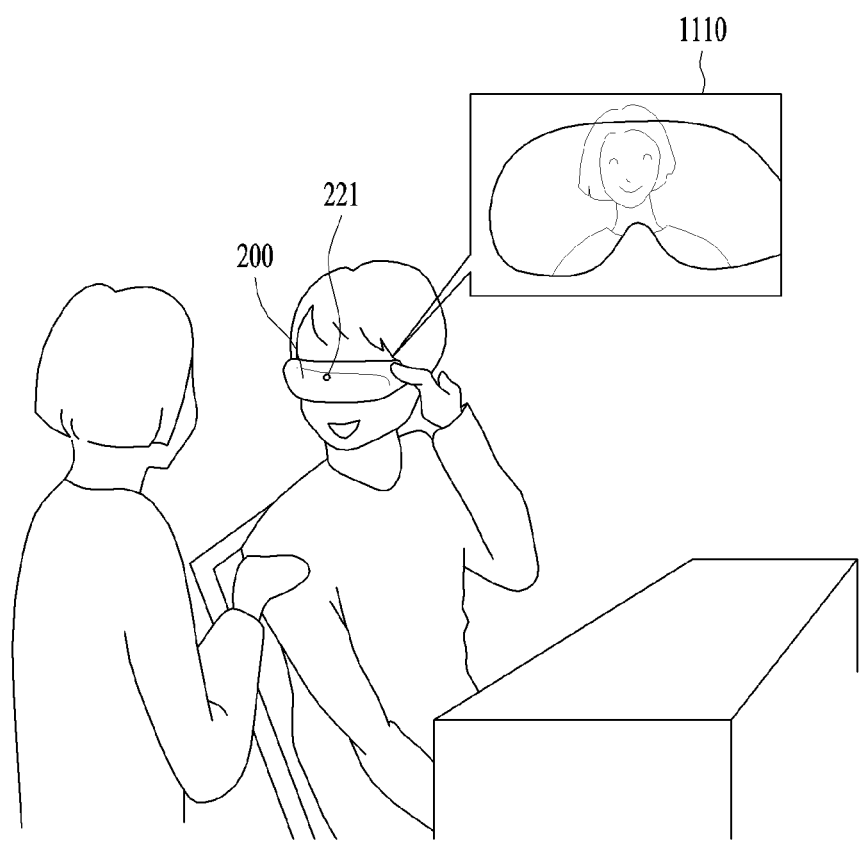
FIG. 11 is a diagram for an example of an external event image output according to one embodiment of the present invention.

FIG. 11 is a diagram for an example of an external event image output according to one embodiment of the present invention.

Referring to FIG. 11, the head mounted display 200 may recognize an external event such as another person approaching a user wearing the head mounted display 200. The head mounted display 200 may output a notification sound for an approaching direction. If the camera 221 provided to the head mounted display 200 faces toward a direction of the approaching person, the head mounted display 200 may obtain an image or video of the approaching person through the camera 221. The head mounted display 200 may output the obtained image to the display 250. For instance, the controller 280 switches a content outputted to the display 250 and then displays the image captured through the camera 221. And, the controller 280 may stop an audio output outputted through the audio module. Hence, the user can check the approaching person through the image 1110 outputted from the display 250. As mentioned in the foregoing description, based on the determined use environment, the head mounted display 200 may output an external event image or video. For instance, when the determined use environment is a private space, if the approaching person approaches in a range of 1 meter, the controller 280 can take an image of the approaching person through the camera 221 and then output the taken image to the display 250. For another instance, when the determined use environment is an external space, if the approaching person approaches in a range of 3 meters, the controller 280 can take an image of the approaching person through the camera 221 and then output the taken image to the display 250.

Based on a content recognition of an outputted content, the head mounted display 200 according to various embodiments of the present invention can indicate a recognized external event. For instance, if a content outputted to the display 250 is a content of which continuous output is important, the controller 280 can output an alarm according to a recognized external event and the outputted content to the display 250 simultaneously. For another instance, if a content outputted to the display 250 is a stoppable (or pausable) content, the controller 280 can display an alarm according to a recognized external event on the display 250 only. This is described with reference to FIG. 12.

Figure 12:
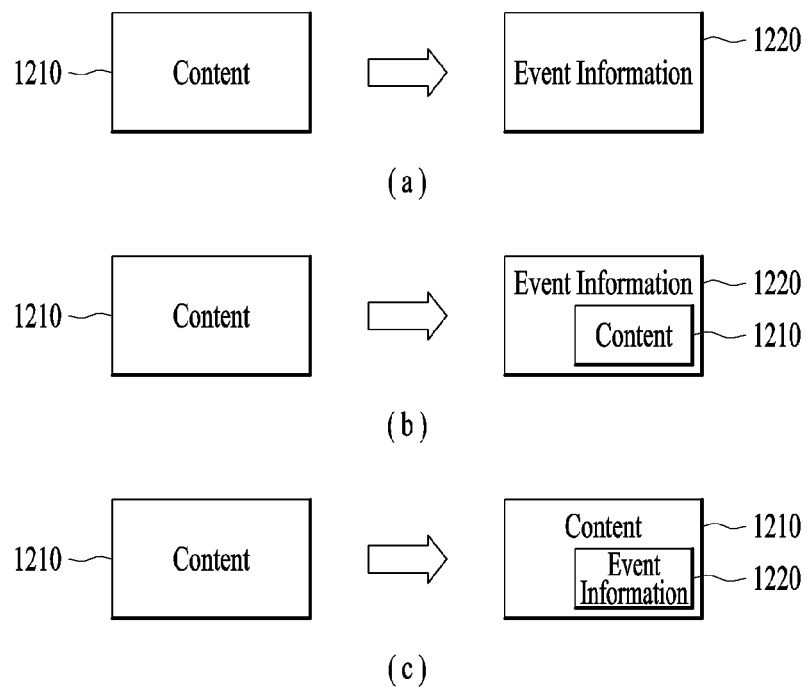
FIG. 12 is a diagram for an example of an event information display according to one embodiment of the present invention.

FIG. 12 is a diagram for an example of an event information display according to one embodiment of the present invention.

Referring to FIG. 12 (a), the head mounted display 200 may output a content 1210 to the display 250. Herein, the outputted content 1210 is a content of which continuous output is not important, e.g., a movie content. The head mounted display 200 may recognize an external event and display information on the recognized external event on the display 250. For instance, the controller 280 pauses the content 1210 displayed on the display 250 and then displays the information 1220 on the recognized external event on the display 250. Thus, the head mounted display 200 can display the information on the recognized external event on the display 250 only.

Referring to FIG. 12 (b) and FIG. 12 (c), the head mounted display 200 may output a content 1210 to the display 250. Herein, the outputted content 1210 is a content of which continuous output is important, e.g., a game content. The head mounted display 200 may recognize an external event and display information on the recognized external event on the display 250. For instance, the controller 280 can display the content 1210 displayed on the display 250 and an information 1220 on the external event on the display 250 simultaneously. Based on the importance of the recognized external event and the determined use environment, the head mounted display 200 may adjust an output size of each of the content and the information on the external event, which are outputted simultaneously. For instance, as shown in FIG. 12 (b), if an information size according to the recognized external event is large, the controller 280 displays the information 1220 on the external event as a main screen of the display 250 and also displays the outputted content as a sub screen. For another instance, as shown in FIG. 12 (c), if an information size according to the recognized external event is small, the controller 280 displays the content 1210 as a main screen of the display 250 and also displays the information 1220 on the external event as a sub screen.

Thus, the head mounted display 200 can variously output the information on the recognized external event according to the determined use environment, the recognized content and the recognized external event.

The head mounted display 200 according to various embodiments of the present invention can obtain an input for adjusting a tracking sensitivity and may adjust a tracking sensitivity according to the obtained input. For instance, the head mounted display 200 may include an adjust key or button for adjusting a tracking sensitivity and adjust a tracking sensitivity according to an input to the adjust key or button. This is described with reference to FIG. 13.

Figure 13:
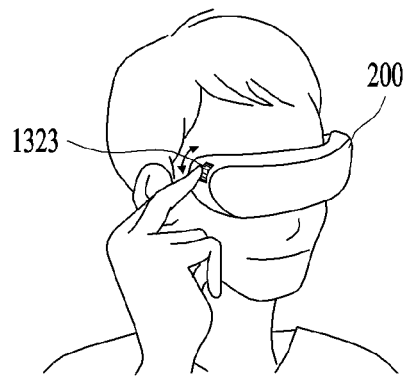
FIG. 13 is a diagram for an example of a tracking sensitivity adjustment according to one embodiment of the present invention.

FIG. 13 is a diagram for an example of a tracking sensitivity adjustment according to one embodiment of the present invention.

Referring to FIG. 13, the head mounted display 200 may include a wheel key 1323 for adjusting a tracking sensitivity. The wheel key 1323 may be included in the user input module 223. The controller 280 of the head mounted display 200 may obtain an input for rotating the wheel key 1323 and then adjust a tracking sensitivity according to the obtained input. For instance, if obtaining an input for rotating the wheel key 1323 in one direction, the controller 280 can raise a tracking sensitivity to be higher than a default tracking sensitivity. If obtaining an input for rotating the wheel key 1323 in another direction, the controller 280 can lower a tracking sensitivity to be lower than the default tracking sensitivity. Thus, the head mounted display 200 can adjust a tracking sensitivity in response to a user input.

Meanwhile, the head mounted display 200 may adjust a tracking sensitivity in response to an input to a prescribed touch-recognizable region of a case configuring an exterior of the head mounted display 200. For instance, if obtaining an input of flicking a prescribed touch-recognizable region in one direction, the controller 280 can raise a tracking sensitivity. If obtaining an input of flicking a prescribed touch-recognizable region in another direction, the controller 280 can lower a tracking sensitivity.

The head mounted display 200 according to various embodiments of the present invention may display a menu for adjusting a tracking sensitivity and then adjust the tracking sensitivity by recognizing a motion according to the displayed menu. For instance, the controller 280 may display a distance to move on the display 250 and then induce a user motion corresponding to the displayed distance. The controller 280 may recognize the induced user motion and then adjust a tracking sensitivity in response to the recognized motion. This is described with reference to FIG. 14.

Figure 14:
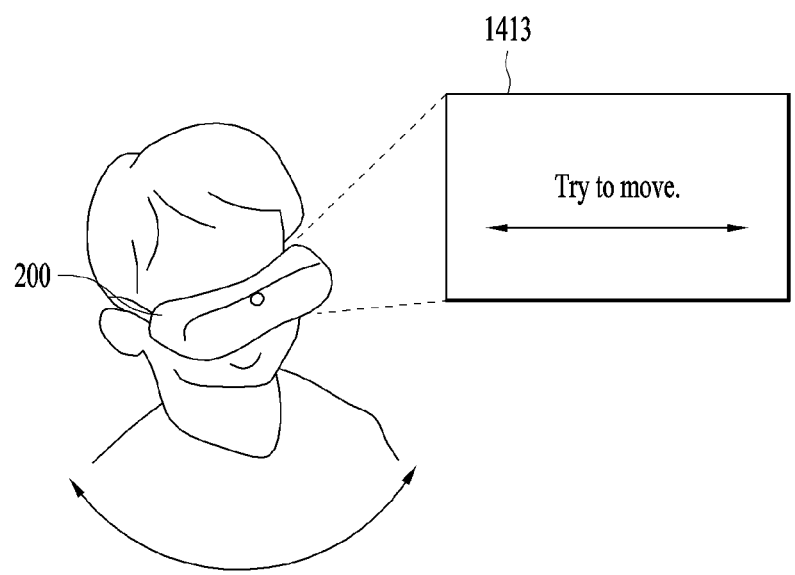
FIG. 14 is a diagram for an example of tracking sensitivity adjustment settings according to one embodiment of the present invention.
Figure 14:
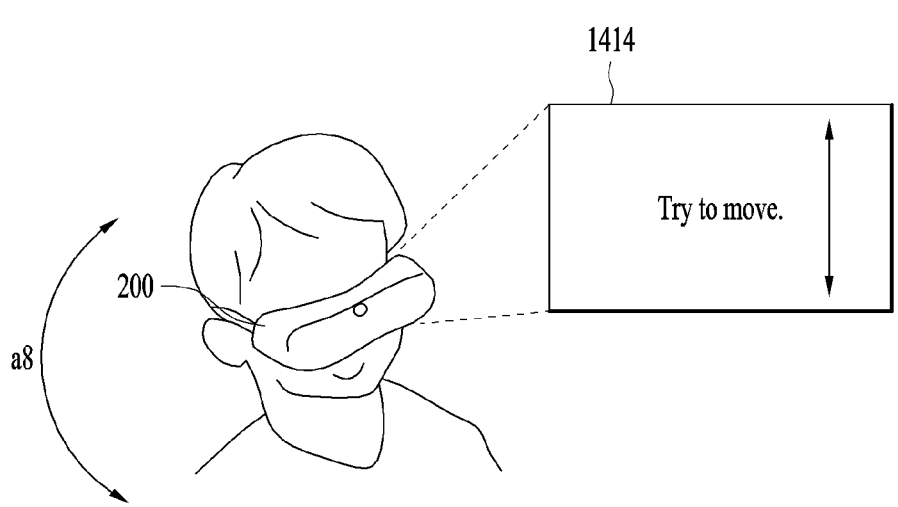

FIG. 14 is a diagram for an example of tracking sensitivity adjustment settings according to one embodiment of the present invention.

Referring to FIG. 14 (a), the controller 280 of the head mounted display 200 may display a first setting screen 1413 for setting a tracking sensitivity for a right-left direction on the display 250. For instance, the controller 280 can display a distance to move in response to a right-left directional motion on the first setting screen 1413. Through the sensor module 240, the controller 280 may recognize a motion a7 that a user wearing the head mounted display 200 moves a head right and left. Based on the recognized motion a7, the controller 280 can adjust a tracking sensitivity. For instance, if the recognized motion a7 is big, the controller 280 may adjust the tracking sensitivity insensitively. If the recognized motion a7 is small, the controller 280 may adjust the tracking sensitivity sensitively. Herein, if the tracking sensitivity is adjusted insensitively, it may mean that a motion on an outputted content is adjusted to be smaller than a motion of a user wearing the head mounted display 200. If the tracking sensitivity is adjusted sensitively, it may mean that a motion on an outputted content is adjusted to be bigger than a motion of a user wearing the head mounted display 200 by raising the tracking sensitivity to be higher than a default tracking sensitivity. Thus, the head mounted display 200 can adjust a tracking sensitivity based on a user motion inputted through a tracking sensitivity adjustment.

Meanwhile, according to the aforementioned tracking sensitivity of the head mounted display 200, a motion recognition according to a most insensitive tracking sensitivity may correspond to a case that a motion in reality is equal to a motion on an outputted content. Therefore, if a tracking sensitivity of the head mounted display 200 is the lowest, a user motion in reality may be equal to a motion on an outputted content.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A head mounted display (HMD), comprising:
a camera;
a display;
a sensor module configured to sense a motion; and
a controller configured to:
   obtain use environment information of a user wearing the HMD, determine a use environment of the HMD based on the obtained use environment information, and
   adjust a tracking sensitivity for sensing the motion of the user based on the determined use environment,
wherein the controller is further configured to:
   recognize at least one person included in an image captured via the camera,
   determine whether the use environment of the HMD is a first environment or a second environment based on an acquaintance between the recognized person and the user,
   adjust the tracking sensitivity to a default tracking sensitivity when the use environment of the HMD is the first environment, and
   adjust the tracking sensitivity to be higher than the default tracking sensitivity when the use environment of the HMD is the second environment.

2. The HMD of claim 1, further comprising:
a microphone configured to obtain a sound,
wherein the controller is further configured to determine the use environment based on the sound obtained by the microphone.

3. The HMD of claim 2, wherein the controller is further configured to:
   recognize an external event for the user wearing the HMD based on the determined use environment and the sound obtained by the microphone, and
   output information on the recognized external event on the display.

4. The HMD of claim 1, further comprising:
a location information module configured to obtain a current location,
wherein the controller is further configured to determine the use environment based on the current location obtained by the location information module.

5. The HMD of claim 1, wherein the controller is further configured to:
   recognize the motion of the user sensed by the sensor module based on the adjusted tracking sensitivity, and
   control an image corresponding to the recognized motion to be outputted on the display.

6. A method of operating a head mounted display (HMD), comprising:
   obtaining use environment information of a user wearing the HMD;
   determining an use environment of the HMD based on the obtained use environment information; and
   adjusting a tracking sensitivity for sensing a motion of the user wearing the HMD based on the determined use environment,
wherein the determining the use environment of the HMD comprises recognizing at least one person included in an image captured via a camera of the mobile terminal and determining whether the use environment of the HMD is a first environment or a second environment based on an acquaintance between the recognized person and the user, and
wherein the adjusting the tracking sensitivity comprises adjusting the tracking sensitivity to a default tracking sensitivity when the use environment of the HMD is the first environment and adjusting the tracking sensitivity to be higher than the default tracking sensitivity when the use environment of the HMD is the second environment.

7. The method of claim 6, wherein the obtaining the use environment information comprises obtaining a sound and wherein the determining the use environment comprises determining the use environment based on the obtained sound.

8. The method of claim 7, further comprising:
   recognizing an external event for the user wearing the HMD based on the determined use environment and the obtained sound; and
   outputting information on the recognized external event.

9. The method of claim 6, wherein the obtaining the use environment information comprises obtaining a current location and wherein the determining the use environment comprises determining the use environment based on the obtained current location.

10. The method of claim 6, further comprising:
   recognizing the motion of the user based on the adjusted tracking sensitivity; and
   outputting an image corresponding to the recognized motion.

* * * * *